CORDLESS ELECTRIC CROSS-CONNECT PANEL WITH IMPROVED MOVABLE CONTACT ASSEMBLY
Original Filed Dec. 8, 1969 13 Sheets-Sheet 1
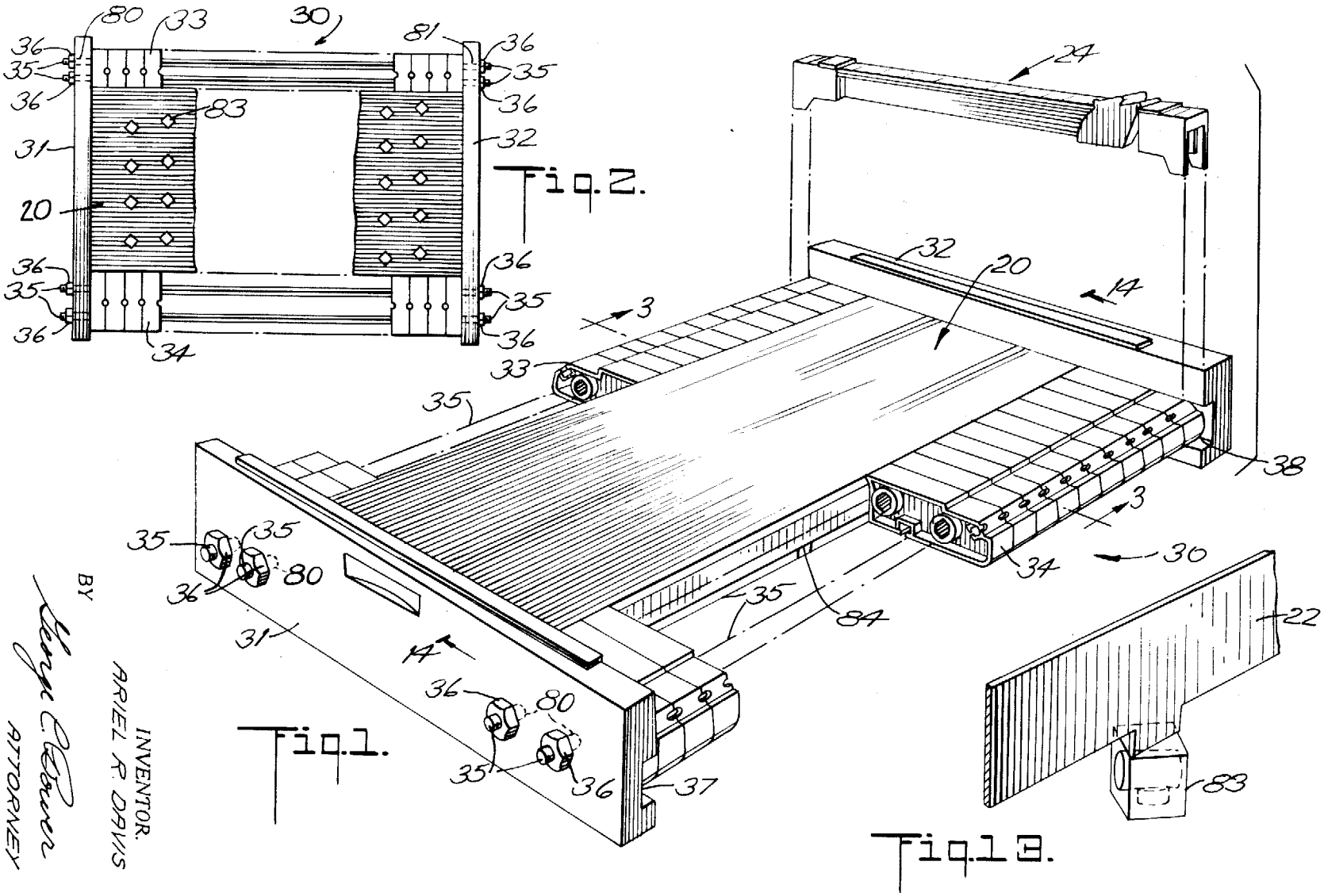

INVENTOR.
ARIEL R. DAVIS
George C. Bower
ATTORNEY

INVENTOR.
ARIEL R. DAVIS
BY
George C. Bower
ATTORNEY

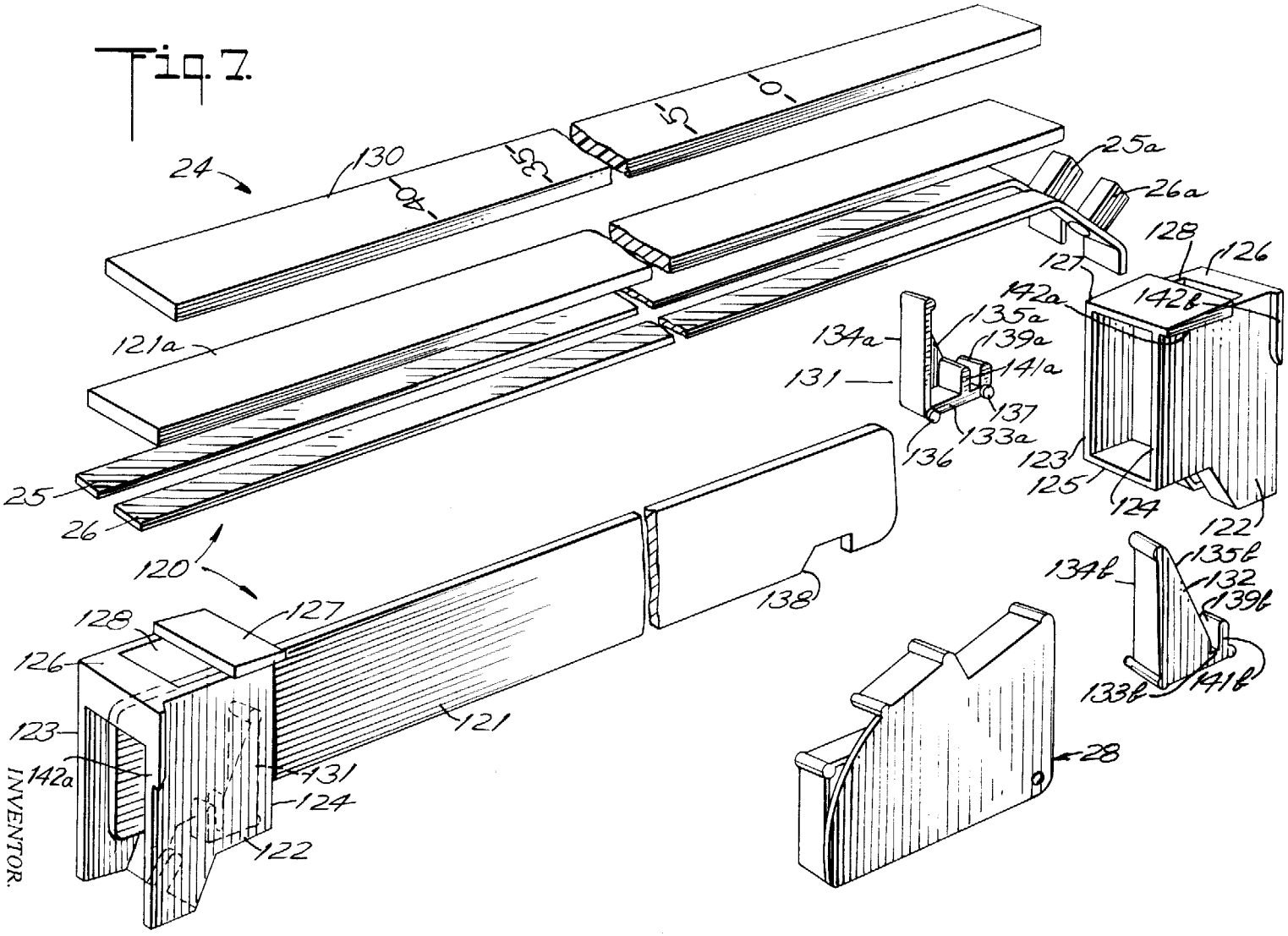
INVENTOR.
ARIEL R. DAVIS
BY
George A. Bower
ATTORNEY

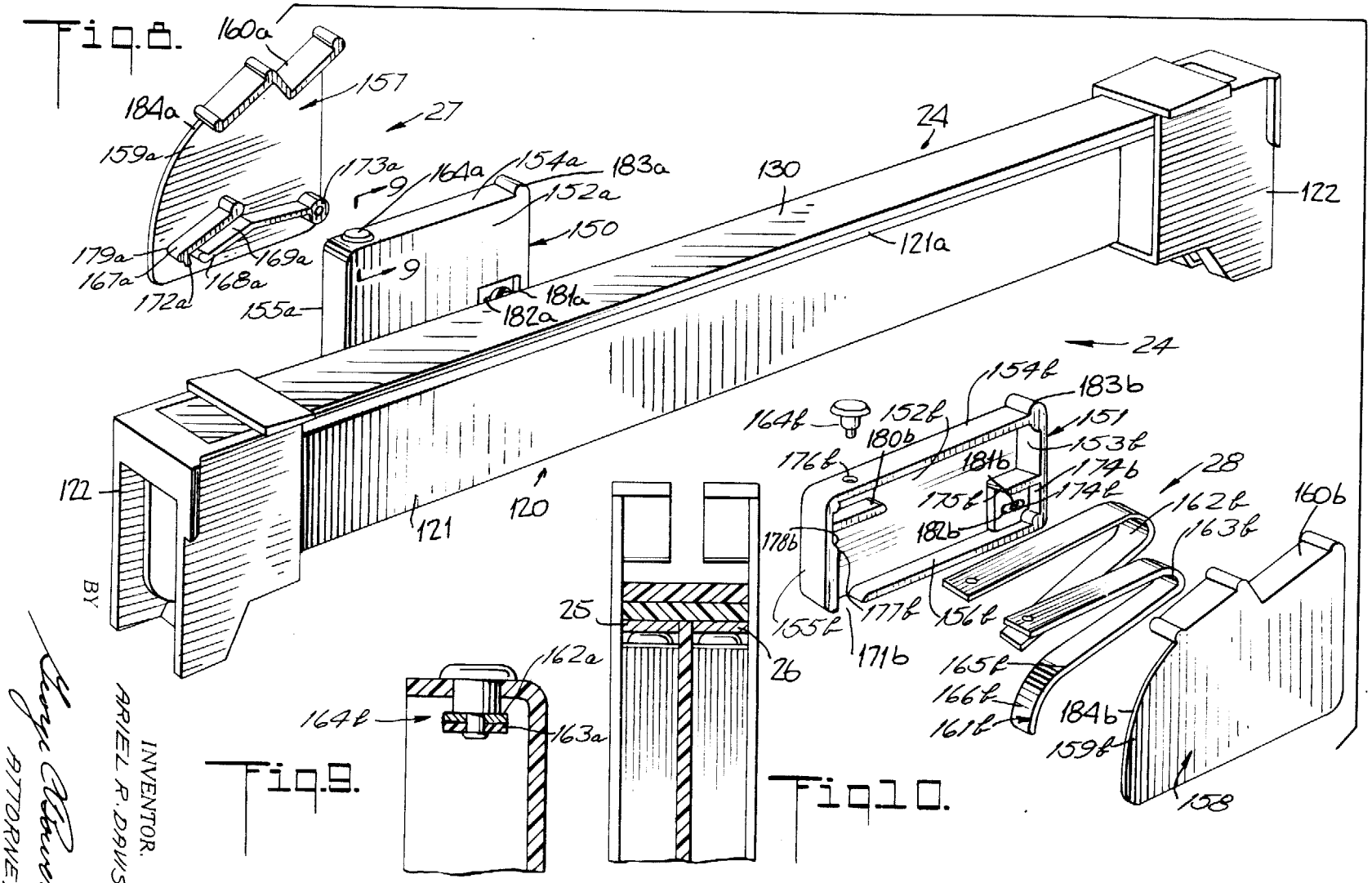
INVENTOR.
ARIEL R. DAVIS
BY
George A. Bower
ATTORNEY

INVENTOR.
ARIEL R. DAVIS
BY
George C. Bower
ATTORNEY

INVENTOR.
ARIEL R. DAVIS
BY
George A. Bauer
ATTORNEY

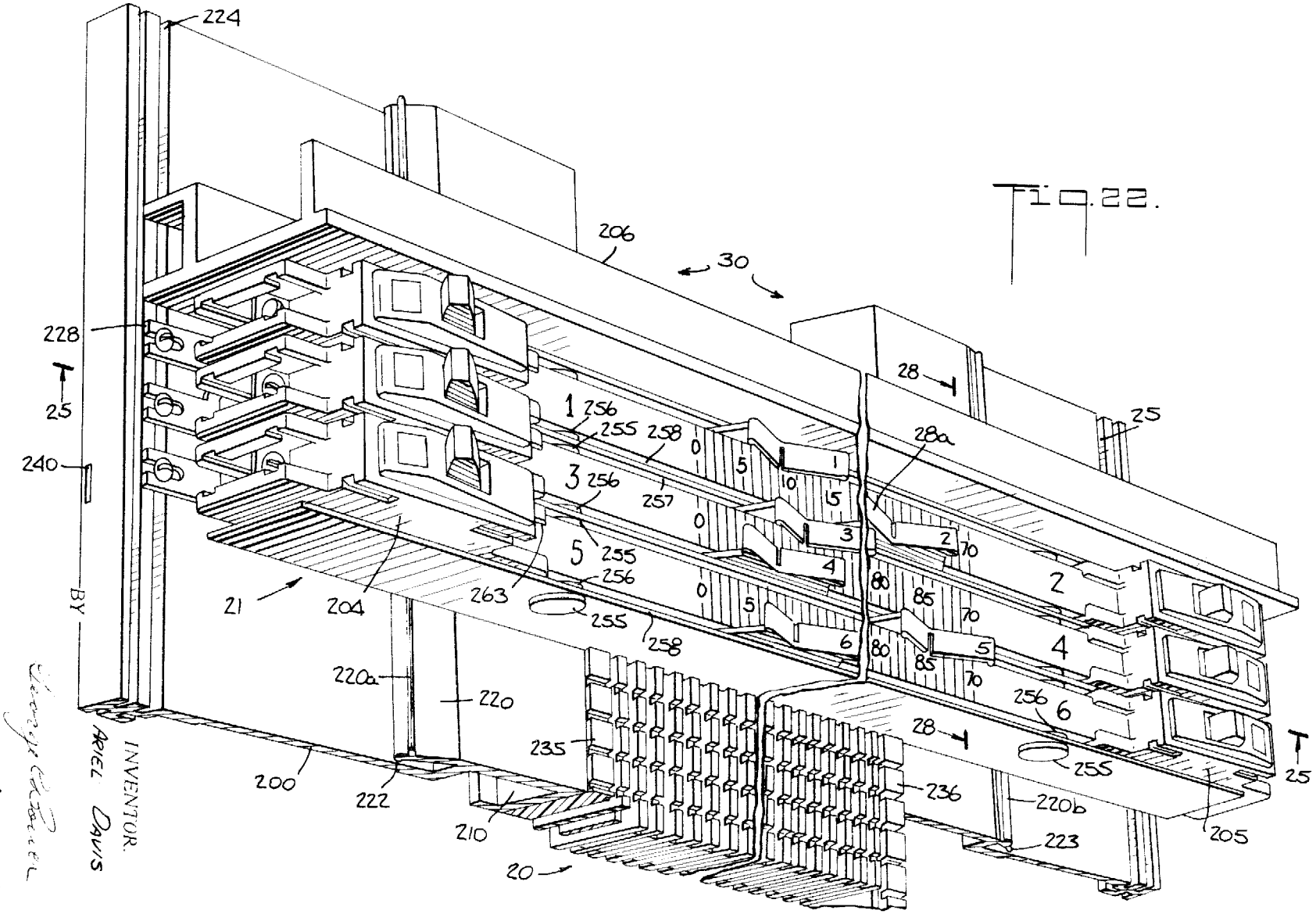
INVENTOR.
ARIEL DAVIS
George C. Bauer
ATTORNEY

INVENTOR
ARIEL DAVIS
BY
George C. Bower
ATTORNEY

INVENTOR.
ARIEL DAVIS

ATTORNEY

INVENTOR.
ARIEL DAVIS
BY
George C. Bower
ATTORNEY

INVENTOR.
ARIEL DAVIS
BY
George H. Bower
ATTORNEY

United States Patent Office

Re. 28,134
Reissued Aug. 27, 1974

28,134

CORDLESS ELECTRIC CROSS-CONNECT PANEL WITH IMPROVED MOVABLE CONTACT ASSEMBLY

Ariel R. Davis, 3476 Fleetwood Drive,
Salt Lake City, Utah 84109

Original No. 3,603,747, dated Sept. 7, 1971, Ser. No. 883,099, Dec. 8, 1969, which is a continuation-in-part of abandoned application Ser. No. 660,988, Aug. 16, 1967. Application for reissue Aug. 7, 1972, Ser. No. 278,437

Int. Cl. H01b *9/00, 15/00;* H02b *1/04*

U.S. Cl. 200—1 R 28 Claims

Matter enclosed in heavy brackets [ ] appears in the original patent but forms no part of this reissue specification; matter printed in italics indicates the additions made by reissue.

ABSTRACT OF THE DISCLOSURE

A cross-connect or patch panel has a multiplicity of long bus bars interleaved with insulating strips and parallel side support beams. Transverse members hold the bus bars, insulating strips and beams together. Cross-connect modules are mounted on the support beams to span the bus bars and strips and to slidably carry contact assemblies for engagement with a selected bus bar. The contact assemblies are actuatable between bus bar contacting and disengaging positions.

*This is a reissue of U.S. Pat. No. 3,603,747 which is a continuation-in-part of abandoned application Ser. No. 660,988, filed Aug. 16, 1967,* [This is a continuation-in-part of my application Ser. No. 660,988 filed on Aug. 16, 1967,] and entitled "Cordless Electric Cross Connect Panel." This invention relates to cordless electric cross-connect panels and is directed particularly to the structure of the panel and the current-carrying components.

BACKGROUND OF THE INVENTION

In various electrical distribution fields it is desirable to provide an electrical connecting means for providing a versatility in the connection of a number of load circuits to any one of a number of input supply circuits. The standard method of accomplishing this is by means of a patch panel in which electrical cords connected to the load circuit have plugs for connection to input supply circuits. This is a rather cumbersome method for interconnecting the input supply lines and the load circuits. Also, the panels are too large and occupy too much space. Cross-connect panels have been developed and used in which the individual load circuits are connected to input bus bars by means of brush assemblies moved crosswise to the bus bars for selective engagement with a given bus bar. Although these operate very satisfactorily, the panels were too large. Additional circuits were required to supply more lamp loads and this required more import bus bars. Also the load requirements made it necessary to increase the size and current-carrying capacity of the bus bars. It therefore is desirable to increase the number of output circuits and size of the bus bars with a reduction in size of the overall rearrangement of the components to reduce the wiring and better relate the contact assemblies and the load-circuit breakers contacting the modules to the respective loads.

Also it is desirable to provide brush assembly having a positive engagement and a positive disengagement in relation with the power buses.

OBJECTS AND SUMMARY OF THE INVENTION

An object of the invention is to provide a cross-connect panel of the bar type that substantially reduces the size of the panel with an increase in input bus bars and number of load circuits that can be connected.

Another object is to provide a cross-connect panel that has a greater number of bus bars with greater current-carrying capacity without increasing the size of the panel.

Another object of the invention is to provide a cross-connect panel in which the size and current-carrying capacity of the bus bar is not limited by the cross-connect panel structure.

Another object of the invention is to provide a contact assembly which is readily locked out of engagement and positively forced into engagement with a selected bus bar.

Another object of the invention is to provide a cross-connect panel that may be assembled from plastic molded pieces to minimize the cost of manufacture and assembly.

Another object of the invention is to provide a cross-connect panel with contact assemblies and cross-connect modules and occupy a minimum of space longitudinal to the bus bars.

Another object of the invention is to visually relate the circuit breakers and cross-module contact assemblies.

Another object of the invention is to provide a panel in which the individual load-supply modules are readily and separately removable from the panel.

In summary the invention relates to a cross-connect panel comprising interleaved, striplike bus bars and insulating strips held together by longitudinal supports and transverse tying members and cross-connect modules spanning the bars and strips for transversely guiding brush assemblies engaging a selected bus bar.

Other and further object will be apparent from the following description taken in connection with the drawings.

BRIEF DESCRIPTION OF THE DRAWINGS

FIG. 1 is a perspective view of the cross-connect panel without the cross-connect modules.

FIG. 2 is a bottom view of the cross-connect panel.

FIG. 7 is a perspective exploded view of a cross-connect module. FIG. 8 is a perspective view of a cross-connect module with contact assembly pieces separated.

FIG. 9 is a fragmentary sectional view of the mounting of the brush of the contact assembly taken along lines 9—9 of FIG. 8.

FIG. 10 is a fragmentary sectional view of a cross-connect module taken along lines 10—10 of FIG. 3.

FIG. 13 is a fragmentary sectional view of the power bus with a connecting lug.

FIG. 22 is a fragmentary perspective view of the third embodiment of the cross-connect panel.

FIG. 25 is a cross-sectional view of the cross-connect panel taken along lines 25—25 of FIG. 22.

DETAILED DESCRIPTION

Introduction

Figure 16:
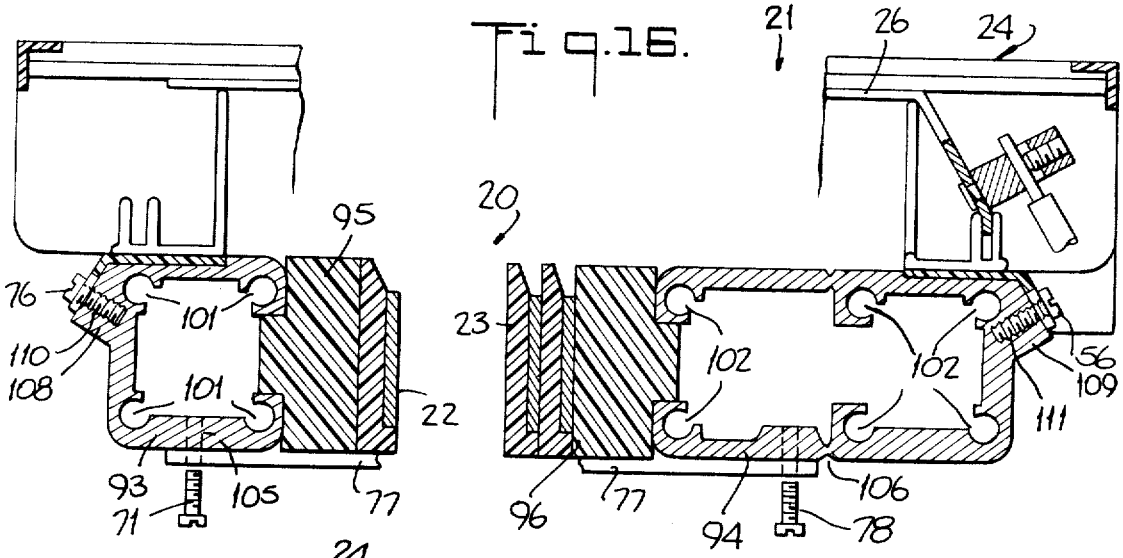
FIG. 16 is a cross-sectional view of another embodiment of the supporting frame taken along a sectional plane similar to FIG. 3.
Figure 17:
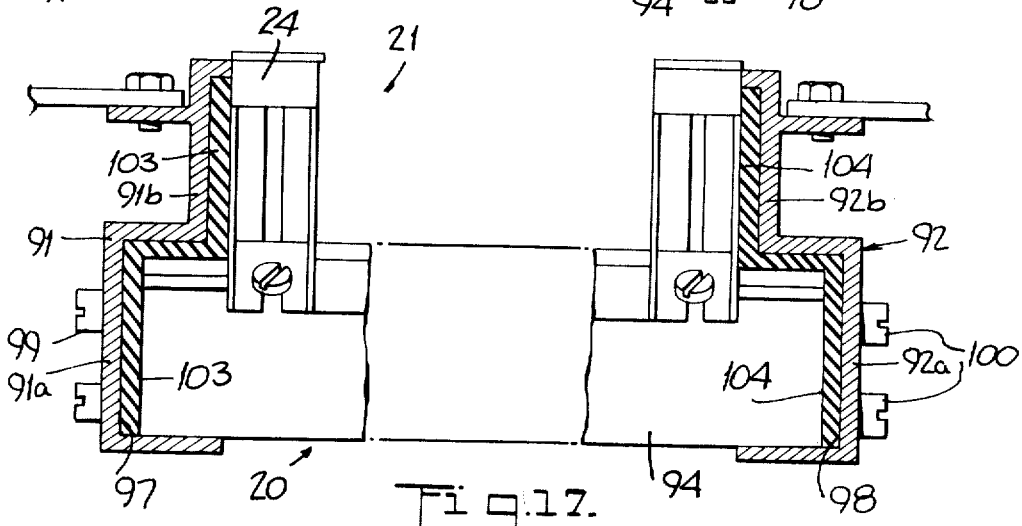
FIG. 17 is a side view of the embodiment of the FIG. 16 with the end-spacing members shown in sectional taken in a longitudinal plane.
Figure 15:
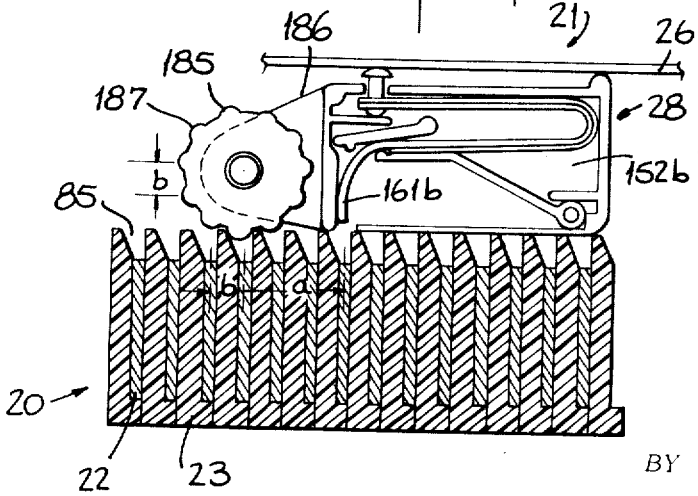
FIG. 15 illustrates an embodiment of the contact assembly with an indexing wheel.

In this specification three basic embodiments of the invention are described and illustrated. One embodiment is shown in FIGS. 1 to 14 and 18 to 21. Another is shown in FIGS. 16 and 17 and a third embodiment is shown in FIGS. 22 to 27. FIG. 15 illustrates an indexing means mounted on the movable contact.

The cordless patch panel comprises a heavy current bus bar supply section 20 and a front cross-connect load section 21. The bus bar supply section comprises conductive bars or buses 22 and insulating strips 23 between the bars. The cross-connect load section comprises cross-connect modules 24 having two rails 25, 26 and two movable contact assemblies 27, 28 for selectively connecting the rails to the same bus or to separate buses. Load circuits connected to the rails may include any power-consuming device such as stage lights. The buses 22 are connected to a power source and the modules 24 are connected to control devices (not shown) such as theater dimmers. The sections 20 and 21 are mounted on a supporting frame 30.

FIRST EMBODIMENT

Supporting frame

The supporting frame 30 comprises two end-spacing or tying members 31, 32 and individual supporting blocks 33, 34 (FIG. 1). A set of supporting blocks 33, 34 is provided for each cross-connect module 24. The end-spacing members 31, 32 and the supporting blocks 33, 34 are fastened together by four rods 35 extending through the blocks and the end-spacing members. Nuts 36 threaded on the ends of the rods secure the supporting members 31, 32 are generally rectangular in shape and have grooves 37, 38 extending longitudinally adjacent the edge of one side. The supporting blocks 33, 34 are stacked in interfitting relation in two rows between the end members 31, 32 and are spaced to receive the power bars 22 and the insulating strips 23. The end-supporting blocks partially fit into the grooves 37, 38. The cross-connect modules are in the space above the supporting blocks, power buses and insulating strips.

Figure 11:
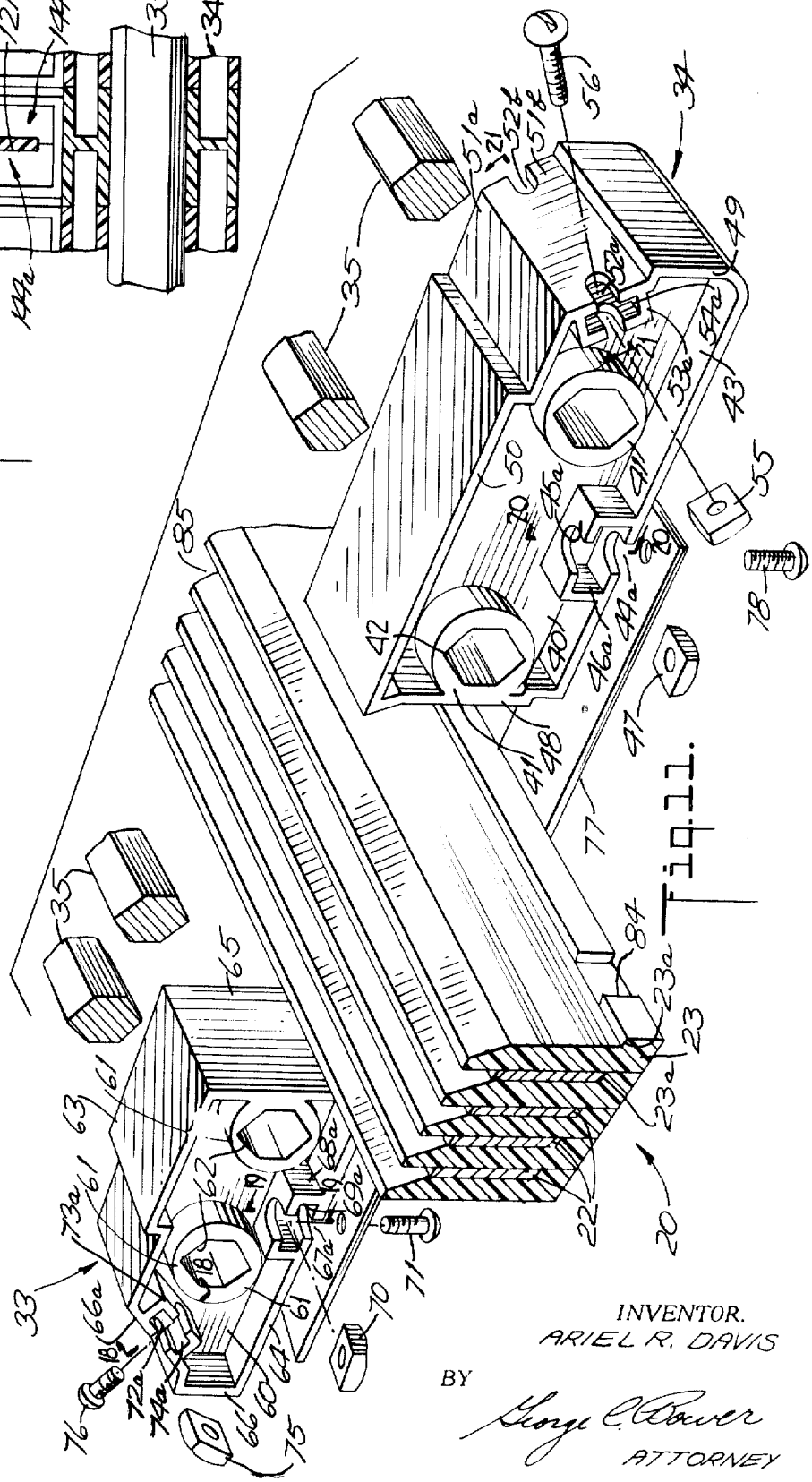
FIG. 11 is a fragmentary perspective exploded view of the support means and rails.

The supporting blocks 34 are generally rectangular in configuration and symmetrically molded (FIGS. 1, 3, 5, 6 and 11). In the middle is a central wall 40 transverse to the rods and having bosses 41 extending from each side of the wall. The bosses have hexagonal-shaped openings 42 for passing the hexagonal rods and hold the rods from turning. The bottom wall 43 has two half openings 44a, b on opposite sides of the central wall 40 (FIG. 20). U-shaped members 45a, b are around the half openings and form slots 46a, b for receiving and holding nuts 47. The inner and outer walls 48, 49 extend on both sides of the center wall (FIG. 11). The top and outer walls 50, 49 are stepped at 51a and sloped at 51b for interfitting with the cross-connect modules 24. The sloped portions 51b of the outer walls have half openings 52a, b and U-shaped portions 53a, 53b forming slots 54a, b (FIG. 21). The slots 54a, b receive nuts 55, one half of the nut extending into a respective member. The supporting blocks 34 are stacked in side-by-side relation with the edges of the inner and outer and top and bottom walls 48, 49, 50, 43 of adjacent blocks and the bosses compressed into contacting relation to form a firm and rigid supporting beam. The surfaces of the walls provide continuous outer surfaces on the stacked blocks.

The supporting blocks 33 are also rectangular in configuration and similar to the supporting blocks 34 except that the supporting blocks 33 are shorter in length (FIGS. 3, 5, 6 and 11). The supporting blocks 33 have an intermediate wall 60 with bosses 61 extending on opposite sides of the intermediate wall 60 are top and bottom walls 63, 64 and inner and outer walls 65, 66. The bottom wall 64 has half openings 67a, b with U-shaped members 68a, b with U-shaped members 68a, b positioned around the openings to form slots 69a, b (FIG. 18), with U-shaped members 73a, b forming slots 74a, b receiving nuts 75 for threading on bolts 76 inserted through the openings 72a, b of contacting supporting blocks.

Thus the supporting blocks 33 and 34 may be assembled into supporting beams. Straps 77 (FIGS. 3, 5, 6 and 11) may extend across the back of the insulating strips and secured by the bolts 78, 71 and threading into nuts 47 and 70 to intermediately support the power buses and insulating strips (FIG. 11).

The end-spacing members 31, 32 have holes 80, 81 (FIG. 1) for spacing the rods and the sets of stacked supporting blocks 33, 34. The end-supporting blocks partially fit into the grooves 37, 38 in the end members for interlocking the end members 31, 32 and the stacked sets.

Power buses

The power buses 22 are nested in the L-shaped insulating strips 23 for stacking between the end-spacing members and the sets of supporting blocks (FIGS. 3, 5, 6 and 11). The ends of the nested power buses and insulating strips fit in the grooves of the end-spacing members. The supports formed by the sets of supporting blocks 33, 34 are spaced to receive the desired number of power buses. The power buses rest on the ledge 29 (FIG. 11) of the L-shaped insulating strip to support the bus and isolate the buses from the bottom of the assembly. The power buses have connecting lugs 83 (FIGS. 2, 11 and 15) extending through notches 84 in the ledges of the insulating strips and projected rearwardly. The lugs of adjacent buses are spaced longitudinally, as illustrated in FIG. 2. These rectangular-shaped lugs are turned to present the diagonal of the lug to the power bus to increase the contact area with the power bus and to rotate them to a 45° angle so that wiring is simplified and the power cable can be kinked to hold it in place. For larger panels the power buses and insulating strips may be intermediately supported by straps 77 extending cross-wise between the stacked supporting blocks (FIG. 11) and fastened thereto by bolts 78, 71 threaded into nuts 47, 70 held in the bottom walls 43, 64 of the supporting blocks. The insulating strips 23 are made of insulating material, such as plastic, and are thicker than the power buses to electrically isolate the buses. The strips extend beyond the copper buses to form grooves 85 (FIGS. 5, 6, 11 and 15). The projecting ends of the insulating strips are tapered by sloping one of the walls to widen the groove for rotary entry of the contacting blade.

Cross-connect modules

Figures 3, 4, 18, 19, 20, 21:
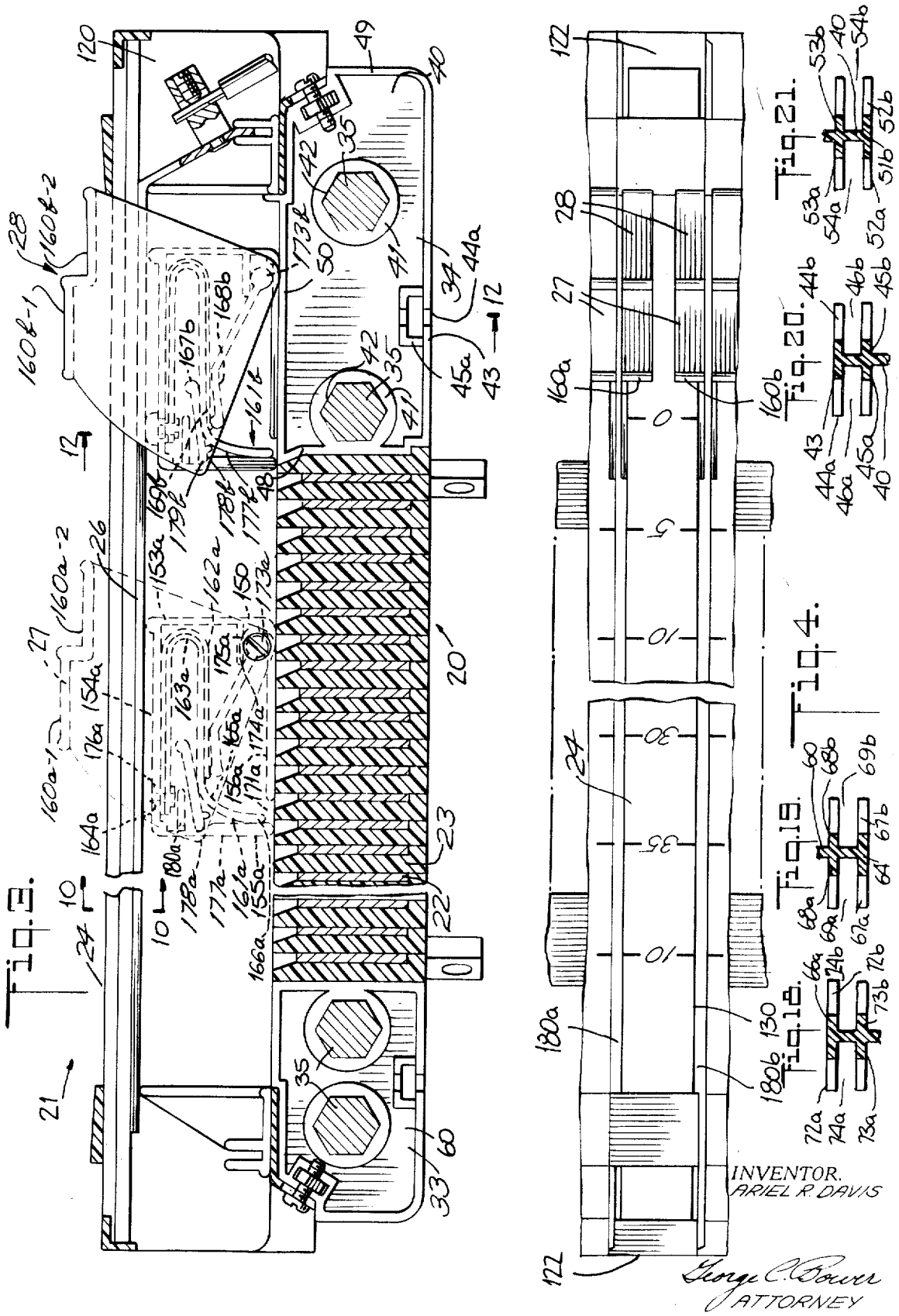
FIG. 3 is a sectional view of the cross-connect panel with a cross-connect module thereon taken along a sectional plane designated by lines 3—3 in FIG. 1.
FIG. 4 is a fragmentary top view of the cross-connect panel.
FIGS. 18–21 are fragmentary sectional views of the nut-retaining means taken along lines 18—18, 19—19, 20—20 and 21—21, respectively, of FIG. 11.
Figures 5, 6:
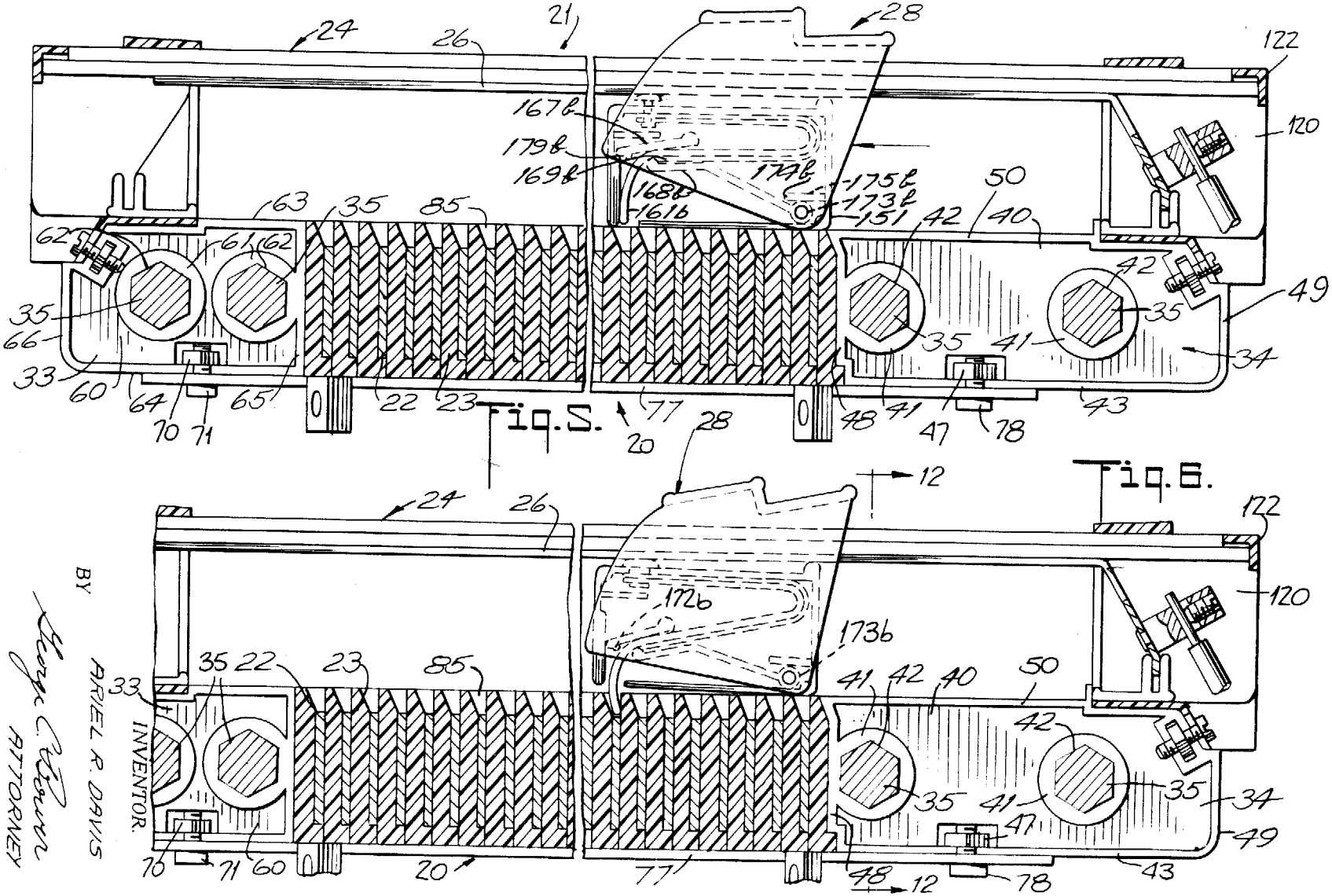
FIG. 5 is a sectional view of the cross-connect panel with a cross-connect module thereon taken along a sectional plane designated by lines 3—3 in FIG. 1, illustrating the cross-connect assembly in the open or unengaged condition.
FIG. 6 is a sectional view of the cross-connect panel with a cross-connect module thereon taken along a sectional plane designated by lines 3—3 in FIG. 1, illustrating the cross-connect assembly in the closed or energized condition.
Figure 12:
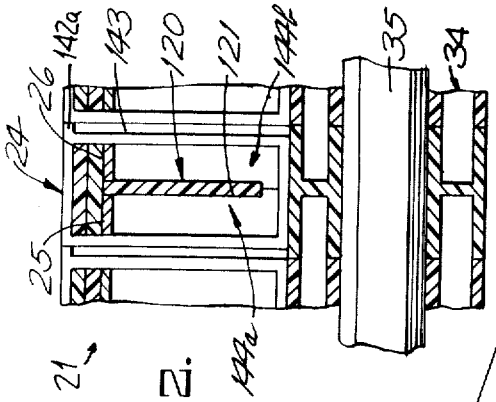
FIG. 12 is a fragmentary sectional view of a cross-connect panel taken along lines 12—12 of FIG. 6.
Figure 14:
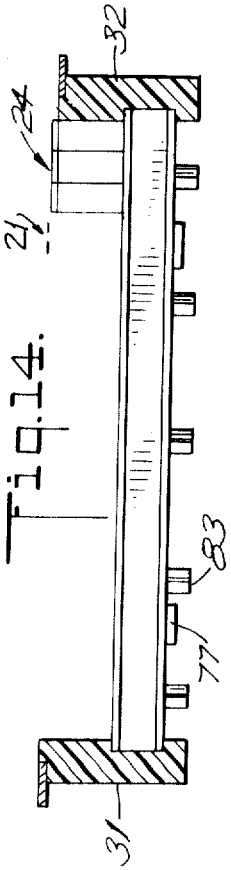
FIG. 14 is a longitudinal sectional view of the cross-connect panel taken along lines 14—14 of FIG. 1 to illustrate the support of the power buses and insulating strips in the end-spacing members.

The cross-connect modules 24 are mounted crosswise to and span all of the buses 22 (FIG. 1). Contact or brush assemblies 27, 28 are slideably supported by the cross-connect modules to connect a particular bus to a respective load rail (FIGS. 3, 4 and 8). A T-shaped insulating support 120 extends the length of the cross-connect modules and has a center wall or partition 121 positioned between the two load rails 25, 26 for electrical isolation and a load rail backing member or wall 121a (FIGS. 7 and 12). The T-shaped support may be a single piece or the center wall and load rail wall may be separate pieces secured together in a suitable manner.

At the ends of the cross-connect modules are cross-connect-mounting members 122 (FIGS. 7 and 8). These members have sidewalls 123, 124 and inner walls 125. The upper ends of the sidewalls are connected by angular-shaped stop members 126 and partial outer walls 127 spaced from the angular-shaped stop members to form rectangular openings 128.

The walls of the mounting members form a chamber for receiving the ends of the T-shaped insulating members and the ends of the rails 25, 26. The inner walls have the same configuration as the outer walls of the supporting blocks. The sloped portions of the inner walls have slots for receiving bolts 56, 76 threading into nuts 55, 75. This securely fastens the mountings to the frame. The T-shaped insulating member 121 extends to and engages the angular-shaped stop members 126 to longitudinally hold the insulating member against movement and against the supporting blocks and L-shaped insulating strips.

The outer wall portions 127 (FIGS. 7 and 8) extend over the edges of the sidewalls of the cross-connect-mounting member and are spaced from the T-shaped insulating member. The transparent light transmiting scale or index strip 130 fits under the wall portions 127 and is longitudinally held in position by the angular-shaped stop member 126.

The load rails 25, 26 (FIG. 12) are rectangular in cross section and are held against the inner side of the wall 121a of the T-shaped insulating member 121 by rail-spacer supports 131, 132 located within the chamber of the cross-connect-mounting members 122 (FIG. 7). The rail-spacer supports 131, 132 are L-shaped and have base members 133a, b extending parallel and resting on the supporting and support members 134a, b extending normal to the supporting block and rail. Triangular-shaped web members 135a, b cooperate with the support members 134a, b and stiffen the rail-spacer supports. The ends of the base and supporting members 133a, b 134a, b are rounded and lateral projections 136, 137 (FIG. 12) are provided at the ends of the base members for fitting in notches 138 in the center wall 121 of the T-shaped support 120 to position the spacer and hold it longitudinally. The rail-spacer supports are mirror images and are positioned on opposite sides of the center wall 121.

The rail-spacer supports 131, 132 hold the load rails 25, 26 against the top wall 121a of the T-shaped insulating support. At one end of the cross-connect module the rails 25, 26 are bent at an angle and fit in the slots 139a, b formed by the outwardly extending projections 141a, b on the base members 133a, b of the rail-spacer supports to anchor the rails in place. This forms the terminal end of the rail and electrical load-connecting lugs 25a, 26a extend normal to the angled portions of the rail and slopes the projections toward the end of the cross-connect module. The load lugs are recessed in the cross-connect mounting between the sidewalls 123, 124 and the T-shaped member 120. Thus the load lugs are easily accessible for inserting and fastening leads.

On one side of the cross-connect-mounting members are longitudinal and lateral side projections 142a, b. Isolating insulating strips 143 (FIG. 12) of a rectangular shape extend longitudinally between the mountings of a modular unit and recess in the projections 142a, b. Thus the T-shaped members 120 and the insulating strips 143 (FIG. 12) form enclosed channels 144a, b extending across and above the power buses 22. The brush or contact assemblies 27, 28 are located in these channels for movement crosswise to the power buses.

Contact Assemblies

The brush or contact assemblies 27, 28 have rectangular-shaped housing 150, 151 (FIGS. 3–8) with side panels 152a, b and four walls 153a, b, 154a, b, 156a, b normal thereto along a respective edge. The housings are greater in length than in height. On the open side of the housings are the actuators 157, 158 formed by flat panel support levers 159a, b and handles 160a, b along the exterior edge. The housings and actuators are in the channels and support blade-type contacts 161a, b U-shaped leaf-type springs 162a, b, conductive straps 163a, b and upper brush contacts 164a, b. The bus-bar-engaging contacts 161a, b have a generally L-shape with mounting legs 165a, b and contacting legs 166a, b. The support levers 159a, b have two generally parallel fingers 167a, b, 168a, b extending normal thereto adjacent the edges opposite from the handles 160a, b and spaced to form slots 169a, b to receive the mounting legs 165a, b and springs 162a, b and straps 163a, b. The fingers have projections 172a, b curving the slots 169a, b for gripping and holding the contacts 161a, b with the contacting legs 166a, b extending beyond the edges of the support levers. Spaced from the contact-supporting fingers 167a, b, 168a, b the support levers 159a, b have pivot studs 173a, b formed by the edge walls 156,a b of the housing and the guide walls 175a, b. The slots 174a, b have open ends facing the contact. The edge walls 156a, b have openings 171a, b through which the contacting legs extend to engage the power buses. The support levers with the contacting legs are swung in and out of engagement with the buses. The U-shaped leaf springs 162a, b are resilient means which fit in the slots 169a, b with the mounting legs and curve to extend along the edge walls 154a, b. Load rail brush contacts 164a, b are attached to the conductive straps 163a, b and springs 162a, b at the ends thereof and extend through the openings 176a, b in the edge walls 154a, b to engage the load rails 25, 26, respectively. The U shaped leaf springs 62a, b also press the support levers longitudinally. Catches 177a, b with rounded edges 178a, b are positioned on the other side of the contacts from the pivots and catch edges 179a, b extend from the fingers 167a, b. The catch edges 179a, b are forced by the springs bearing against walls 155a, b to engage the catches 177a, b and hold a respective support lever with the contacts in the raised or disengaged position.

The housings 150, 151 and support levers 159a, b are held together by assembly screws 181a, 181b threaded into pivot studs 173a, b, respectively, through elongated slots 182a, b, respectively, in the walls 152a, b, respectively. The support or actuating levers 159a, b extend through slots 180a, b (FIG. 4) between the strips and exteriorly to the scale 130. Handles 160a, b normal to the support levers provide means for manual pressing of the support levers to pivot contacts in and out of engagement. The handles extend over the contacts to provide a moment towards the bus bars to disengage the catches and press the contacts into engagement.

The load rail brushes 164a, b (FIG. 8) project beyond the edge walls 154a, b and knobs 183a, b are provided at the other end to restrict rocking movement of the housing on actuation or movement of the brush assemblies. The brush assemblies are movable over the length of the channels.

The conductive load rails 25 and 26 are made of copper and the brush contacts 164a, b are made of silver. The conductive straps 163a, b may be made of a plurality of flexible copper strips. The power buses 22 and the contacts 161a, b may also be made of copper.

The blade is forced and held into engagement by the U-shaped steel springs 162a, b to force and hold the blade in a current transfer relation. The U-shaped springs 162a, b force the contact blade into engagement with the power buses and the brushes 164a, b into engagement with the load rails 25, 26. Thus a good transfer of current occurs between the power buses and the load rails.

The handles 160a, b are positioned on opposite sides of the moment arm through the pivot studs 173a, b so that on engagement of the handle portions 160a–2, b–2 by the fingers of an operator the support lever will be rotated in a clockwise direction (FIG. 3) to withdraw the contact blade from engagement of the handle portions 160a–1, b–1 by the fingers of an operator the support lever is rotated in an opposite direction forcing the fingers 179a, b to disengage from the rounded-edge catches 177a, b.

Partition walls 182a, b are spaced from the walls 154a, b to provide a space for the brushes 164a, b and to provide a stop engaged by the fingers 167a, b on removal of the contact blades 161a, b. On rotation of the support lever the pivot studs 173a, b slide in the slots 174a, b to accommodate the engagement and disengagement of the fingers 179a, b. Thus the contact assemblies 27 and 28, which are mirror images of one another, may be moved longitudinally along the cross-connect modules with the contact blade recessed, and may be parked in the space provided by the supporting blocks 34, as illustrated in FIGS. 3 and 4.

The Index Scale Means

The positions of the contact assemblies are related to the power buses 22 by the index strip 130 on the cross-connect modules. The walls 127 of the mounting members 122 are spaced from the walls 121a of the T-shaped support 120. The index strip 130 fits in this space and extends above the wall 121a. On the undersurface of the strip engaging the wall 121a a scale may be engraved corresponding to the number of power buses 22. The ends of the indexing strip 130 engage the angles 126 so as to position the scale in relation to the power buses 22. The edges 184a, b of the support levers 159a, b are shaped or curved as illustrated so that when an edge is at a given indicia on the scale, the contact blade is at the corresponding power bus. On rotation of the actuators 157, 158 the respective edges maintain relationship with the respective indicia for the respective power bus that the contact blade is at or in engagement within either the engaging or disengaging position.

The walls 126 are spaced from the angle members 127 to form openings or windows. Illumination means may extend laterally through the cross-connect modules to provide light that is carried by the transparent indexing strip to illuminate the engraved indicia. The index strip may be made of methylmethacrylate.

In FIG. 15 the contact assembly 28 is shown with an indexing wheel 185. The wheel 185 is rotatably mounted on the extension 186 from the 152b and has knobs or projections 187 circumferentially spaced apart a distance equal to the distance b between groove centers. The center of the wheel is a distance a from blade 161b which is a multiple of distance b. The base of the projection has a circumferential width greater than the distance b to provide an in and out movement of the contact assembly on moving over a strip. When a projection 187 is seated in a groove 85 the blade 161b is in position for insertion in a groove 85 and contacting a bus 22. Thus the inward seating of the projection is detected by the operator for proper positioning of the contact assembly.

SECOND EMBODIMENT

In FIGS. 16 and 17 another embodiment of the supporting frame is illustrated. The supports extending longitudinally to the power buses and mounted in the end-spacing members 91 and 92 comprise aluminum extruded members 93 and 94 and insulating plastic members 95 and 96. The end-spacing or tying members 91 and 92 are extruded aluminum pieces having U-shaped portions 91a, 92a forming grooves 97 and 98 to receive the extruded aluminum members 93 and 94 and the plastic members 95 and 96. Bolts 99 and 100 extend through the U-shaped portions 91a and 92a and thread into the channels 101, 102 in the aluminum members 93 and 94. The end spacing members have planar portions 91b and 92b extending upwardly from the U-shaped portions to provide end supports for the cross-connected modules. Insulating linings 103, 104 are provided between the cross-connect modules and the aluminum end spacing members 91 and 92 to electrically isolate the end contact assemblies. The plastic members 95 and 96 electrically isolate the aluminum members 93 and 94 from the power buses 22. Tapped holes 105 and 106 are provided in the bottom portions of the aluminum members to receive bolts 71 and 78 for connecting straps 77. In the outer wall the aluminum members are provided with bosses 108 and 109 having grooves 110 and 111 for receiving screws 76, 56 to connect the members 24 to the aluminum members with allowance for sidewise adjustment.

THIRD EMBODIMENT

Introduction

As in the first embodiment the panel comprises a heavy current bus bar supply section 20, a front cross-connect load section 21 and a supporting frame 30. The insulating strips 23a are flat and do not have the ledges 29 of the insulating strips 23. The supporting frame 30 comprises the supports 200, 201 and the rods 202 extending through the heavy current bus bar supply section 20 and secured to the supports by nuts 203. The cross-connect load section 21 comprises the cross-connect modules 24a with circuit breakers 204, 205 and the end members 206, 207.

Bus bar supply section

The bus bar supply section 21 has longitudinally extending copper bus bars 22 separated by the wider insulating strips 23a. *The bus bars and the insulating strips are thin and each have a width many times its thickness. The bus bars and insulating strips are in side-by-side interleaved relation. The supply has two opposite sides and a back.* The length and number of the bus bar and insulating strips depend on the size of the panel. The insulating strips extend forwardly and rearwardly of the bus bars to provide electrical isolation of the bus bars and grooves on front for the blades of the movable contacts 27a, 28a. On the back the bus bars have square-shaped lugs 83 for connection of the bus bar to the main supply lines. The lugs are offset from one another to provide ample space for leads.

Support frame

The supports 200, 201 of the support frame extend longitudinally on opposite sides of the bus bar supply section 20 and may be made of any length to accommodate the desired number of cross-connect modules. As distinguished from the first embodiment and similar to the second embodiment the supports are single extruded pieces that are stiff and rigid to provide a firm support for the cross-connect panel and rigid connection to a supporting frame (not shown). The supports have a cross-sectional U-shape configuration transverse to the bus bars 20. The cross-sectional U-shape is formed by inner L-shaped flanges 210, 211 and outer L-shaped flanges 212, 213 extending along opposite edges of the respective outwardly facing walls 214, 215. The width A of the inner flanges are the same or about the same as the width B of the insulating members 23a of the bus bar supply section. The width of the support is several times the width of the width of the inner flanges 210, 211. The supports therefore have a shallow configuration.

The two supports have inner portions 216, 217 and outer portions 218, 219. The outer portions are greater in width than the inner portions and have the circuit breakers 204, 205 fastened thereto. The outer portions are 2.5 times as wide as the inner portions. Deformable flanges 220, 221 extend from the upper edges of the inner portions in the direction of the width of the supports. Longitudinally extending beads 220a, 221a are provided along the edges of the flange and are engaged by the tool pressing against the flanges to bend them downwardly or rearwardly. Narrow longitudinal slots 222, 223 between the edges of the flange and the outer portions. Grooves 224, 225 extend longitudinally along the respective edges of the outer portions. The circuit breakers have mounting clips 228, 229, 230, 231 with forked portions 228a, 229a, 230a, 231a fastened to the supports by screws 232, 233, respectively, threaded into the grooves 224, 225 and by fork portions 229b, 230b, frictionally sliding into the slots 222, 223. Along the outer sides of the flanges 212, 213 are T-shaped members 244, 245 forming slots 246, 248 and 247, 249, respectively. The slots and members extend the length of the respective supports. The screws 241 may be threaded into the slots 246, 247 for fastening the straps 240. A panel 249 may be fastened by bolts 249a threading into the slots 246, 247 (FIG. 25).

The supports are fastened to the bus bar section 20 and to one another by rods 202 passing through the bus bars 22, insulating strips 23a, insulating members 235, 236 and the flanges 210, 211. Insulating members 235, 236 having a substantially greater thickness than the insulating strips 23a are between the flanges 210, 211, respectively, and the bus bars and insulating strips.

The bus bars 22 and insulating strips 23a have axially aligned holes 237, 238 forming bores through one supply section 21 for the rods the holes 237 are larger than the holes 238 and grommets 239 are fitted in the holes 237. The grommets are initially wider than the bus bars and made of a deformable plastic electrically insulating material. On tightening of the nuts the insulating strips press against the grommets and flow the grommet material into bevels 239a in the holes 237 in the bus bar. These compressed grommets electrically isolate the rods from the copper bus bars 22.

The supports 200, 201 are also fastened together by U-shaped straps 240 extending transversely across the back of the patch panel and fastened by screws 241 threaded into the inner and outer flanges. Insulating layers 242 of plastic material is recessed between the inner flanges and across the back of the bus bar supply section to electrically isolate the respective straps 240 from the bus bars 22.

Cross-connect modules

The cross-connect modules 24a have a main T-shaped member 250 formed by partition 251 tightly fitting in a lengthwise groove in the load rail backing or crossmember 252. Attached to one side of the T-shaped member is a second partition member 253 parallel to the first. Stubs 254 with flat disc-shaped heads 255 are fastened by flat disc-shaped washers 256 on the other side from the heads. The stubs fit snugly into holes in the first partition member. The fastening washers 256 engage the edge of the load-rail-backing member 252 to space the second partition from first. The free end of the stub passing through the first partition member bears against the head of the adjacent stub of the adjacent module to impart firmness and rigidity to the successive modules. The partitions form channels for the movable contacts 27a, 28a and the fastening washers 256 form slots 257 between the second partition member and the load-rail-backing member to pass the movable contacts 27a, 28a.

The edges of the insulating strips 23a have aligned notches 260 for receiving the inner edges of the vertical partition members 251, 253. The interlocking of the edges of the partition members and insulating strips holds the inner portions of the partition members in proper space relation. The outer portions are held in position by the end-to-end engagement of the stubs. The partition members are thin flexible pieces. The interfitting of the edges into the grooves and the clamping of the outer edges interlocks the cross-connect modules in a firm fixed relation. Thus, the modules with the load-rail-backing member 252 and two partition members 251, 253 in side-by-side relation form successive parallel movable contact channels 261, 262.

At opposite ends of the modules are circuit breakers 204, 205 in planar or end-to-end alignment with modules and transverse to the supports. Mounting clips 228, 229, 230, 231 are pressfitted into the opposite lower ends of the circuit breaker with forked portions of the mounting clips extending in the plane of the bottom of circuit breakers. The forked portions 229b, 230b extending towards the bus bars fits in the slots 222, 223 and under the flanges 221 extending from the inner portions 216, 217. At the other end forked portions 228b, 231b of the mounting clips are fastened by screws 232, 233 threading into the grooves 224, 225.

The rails 25, 26 are attached to the circuit breakers 204, 205, respectively, and extend in respective channels 261, 262. The rails are bent at one end and connected to terminals (not shown) in the recesses 263, 264, respectively. In the contact module the rails fit between the stubs 254, and the load-rail-backing member 252 to firmly hold the rails in place between the partition members 251, 253 and against the member 252. The load-rail-backing member has end tabs 265, 266 narrower than the width of the member 252. The tabs fit in grooves or recesses 263, 264 in the ends of the circuit breakers facing the contact module. The circuit breakers 204, 205 firmly hold the contact module 24 in place on the frame.

Contact assemblies

The contact assemblies 27, 28 are identical and comprise mounting or actuating members 270 extending through the slots 257, 258 in the contact modules 24 with the flanges or handles 271 normal to the respective members 270. The handles are U-shaped and have grips 271a, b for grasping by the fingers to lift the assemblies. A slot 272 provides for visual location of the contact assembly in relation to the index on the contact module. The blocks 273 are mounted on the side of the respective actuating members by screws 274 threaded therein. The blocks extend beyond the respective actuating members and have blades 275 mounted respectively therein and extend from edge. The resilient current-conducting strips 276 of beryllium copper are intermediately mounted to the respective ends of the block 273 opposite to the contact blade 275. The conducting strip bearing end of the block 273 is located in about the center of the respective actuating member. The conducting strip 276 extends along the side of the actuating member beyond the end edges L-shaped tips 277, 278 on the ends engage one of the rails on substantially equal distances from the center of the actuating members. The conducting strips apply equal and opposite torques to the contact assembly. Thus, each assembly will stand perpendicular to the bus bars. Resilient steel strip 279 backs the conducting strip to provide adequate contact pressure. The flanges, block, blade and conducting strips are on the same side of the actuating member.

The contact assembly is picked up by the tips 277, 278 and lifted clear of the insulating strips 23a and moved along the channel until the slot 272 is at the indicia on the exposed surface of the member 252. The contact assembly is then released to engage the selected bar. As best seen in FIG. 25 the stubs 254 are adjacent to a respective circuit breaker and also function as stops engaged by a respective tip 277, 278. When in engagement with a stub the blade 275 is in a position for insertion into the grooves 280, 281 formed by the last insulating strips 23a along a respective side and respective insulating members 235, 236. These are neutral positions at each end of the module.

Markings and indicia

Figure 23:
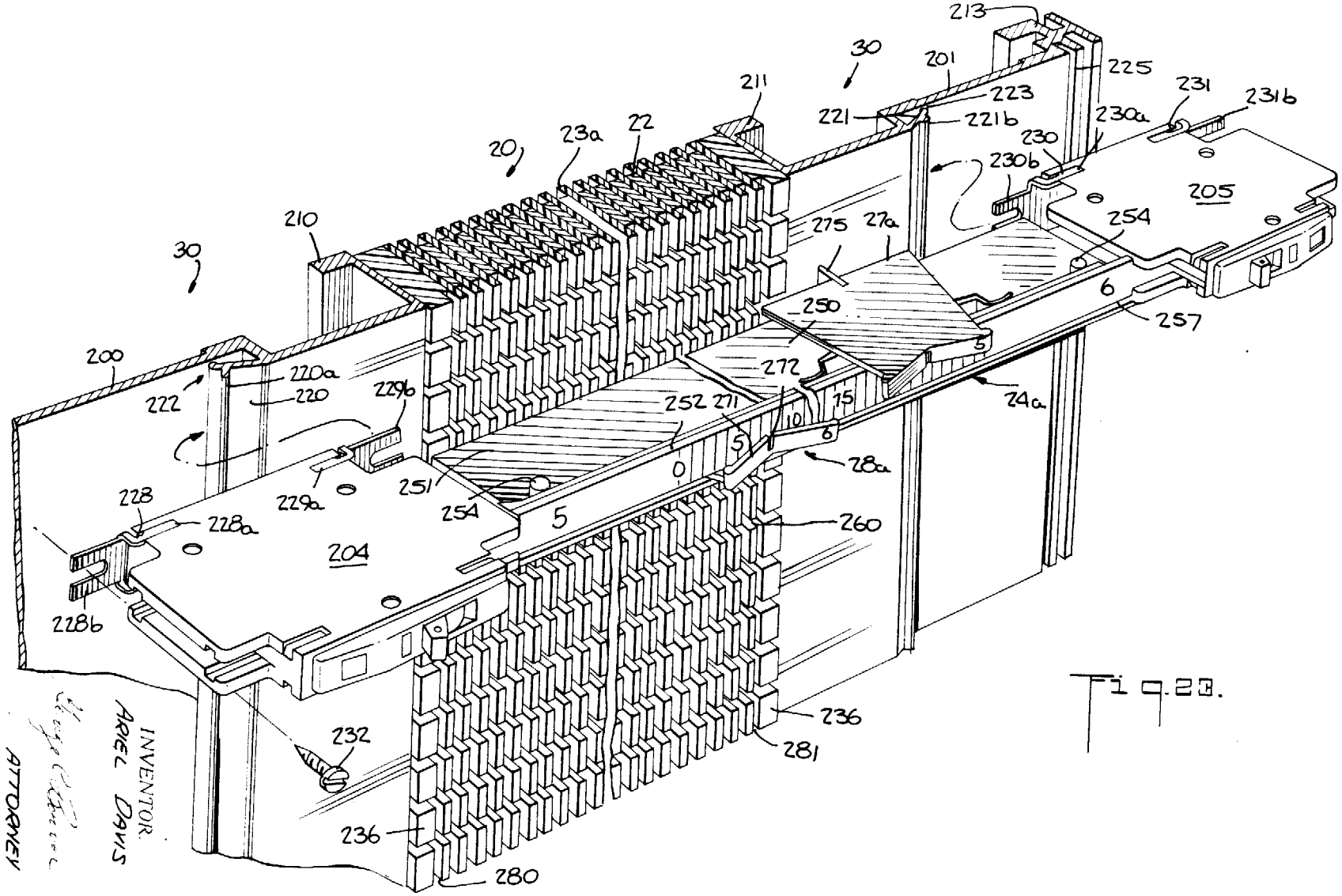
FIG. 23 is a fragmentary perspective view of the bus bars and support members with a cross-connect module in space relation.
Figure 24:
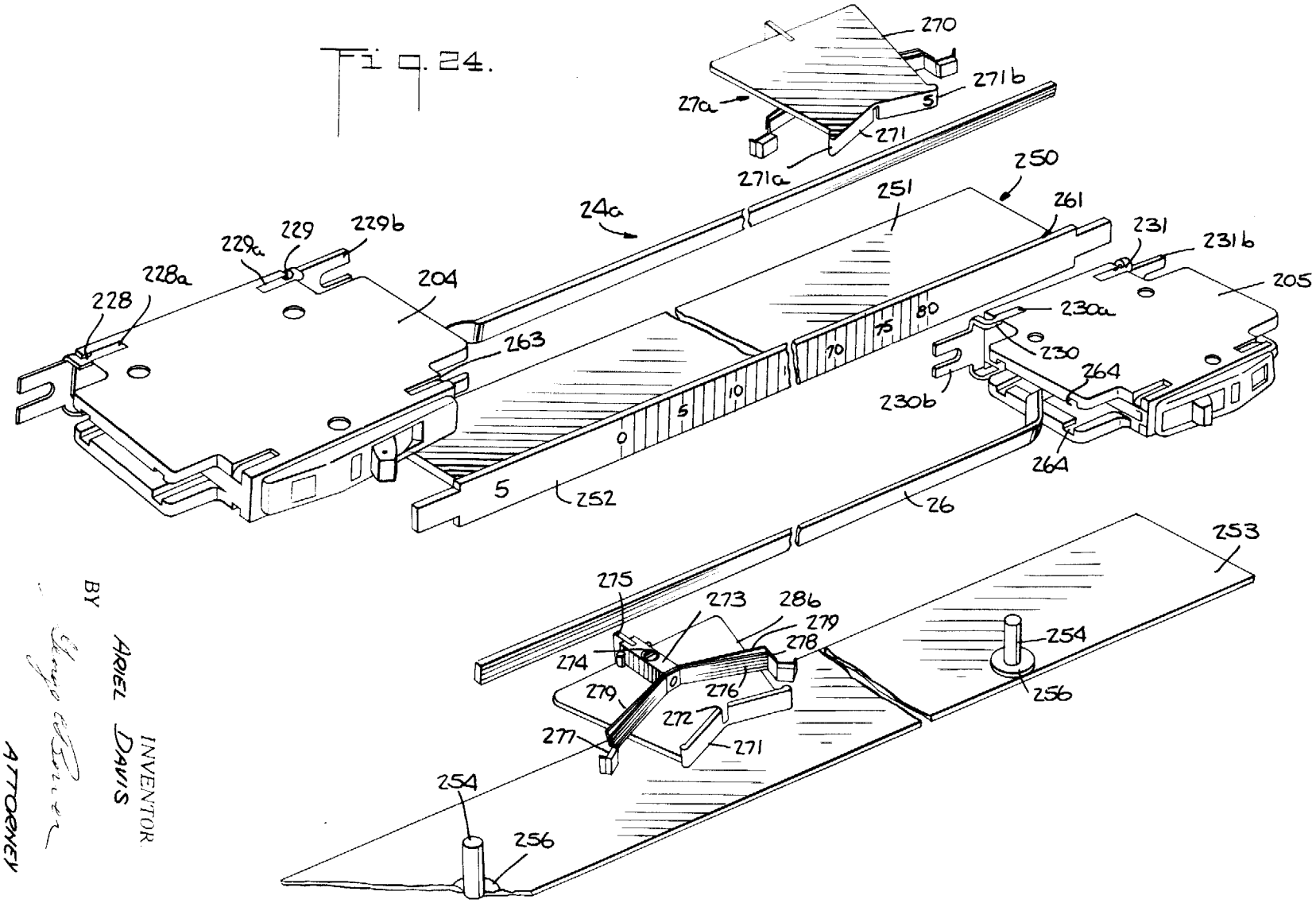
FIG. 24 is an exploded perspective view of a cross-connect module.
Figure 26:
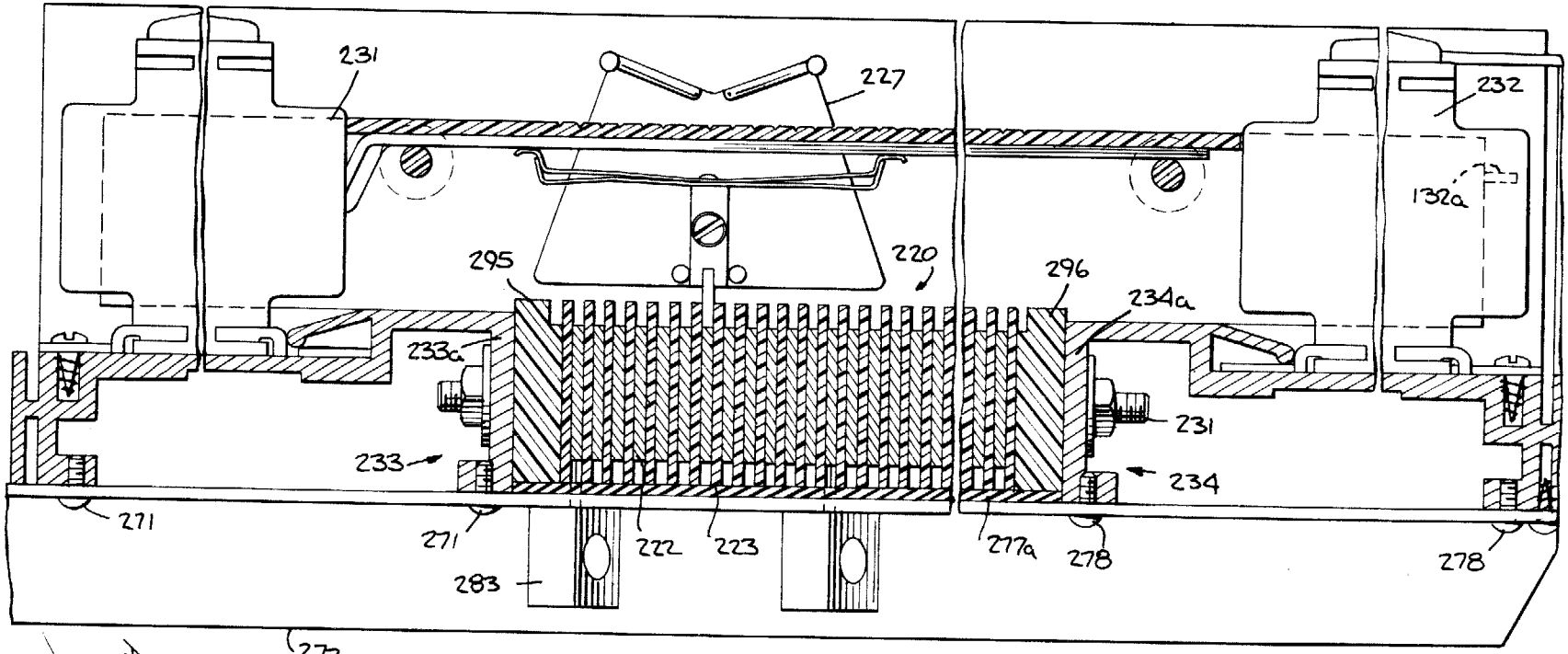
FIG. 26 is a fragmentary rear view of the cross-connect panel.
Figure 26:
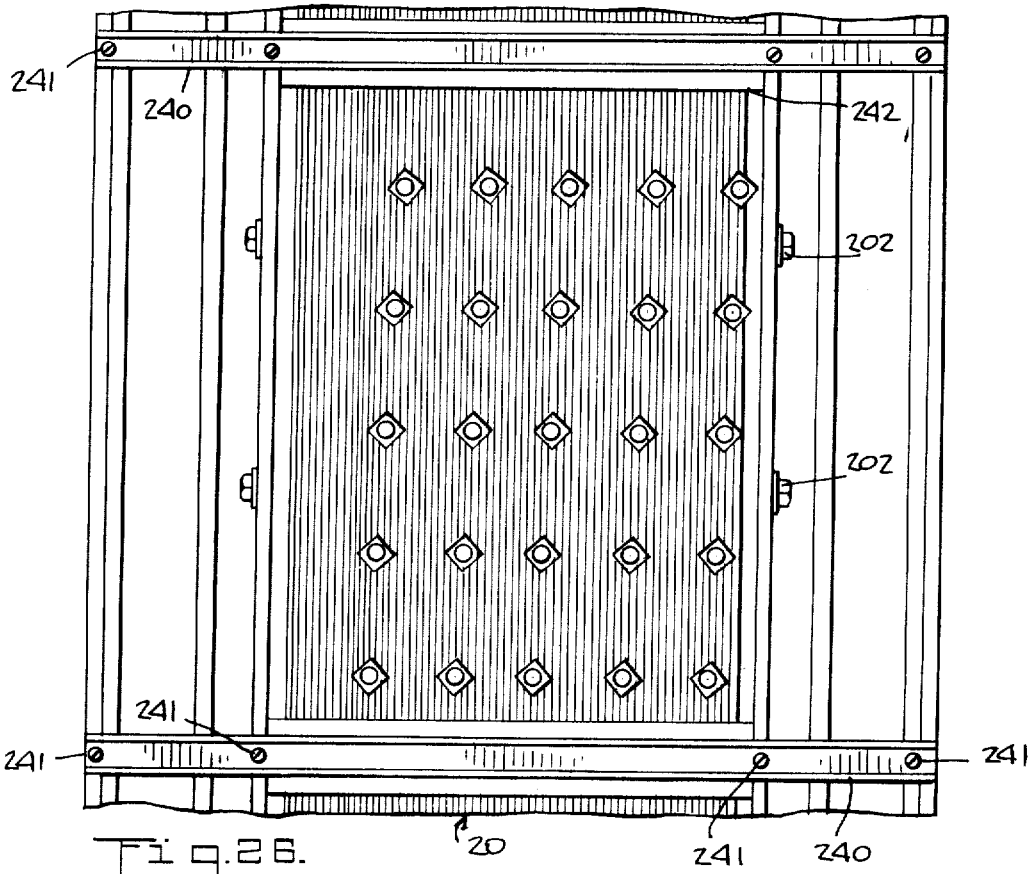
Figure 27:
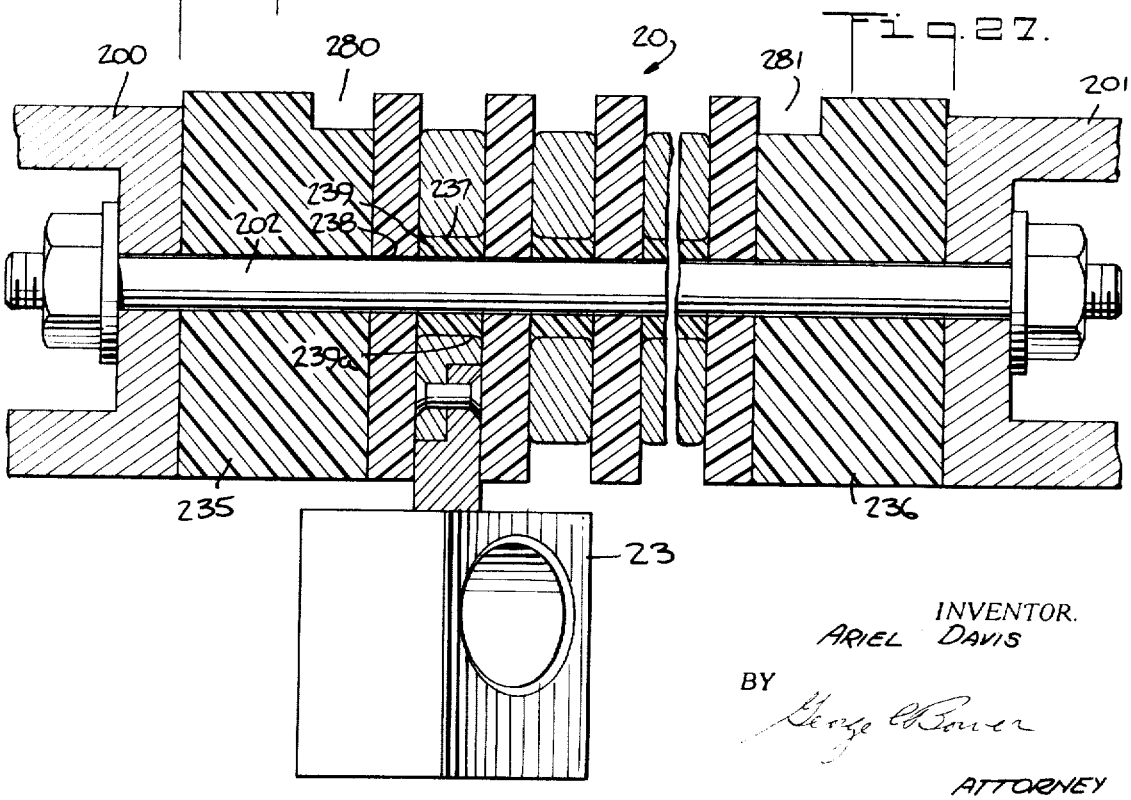
FIG. 27 is a fragmentary sectional view of the bus bar section taken along lines 27—27 of FIG. 26 illustrating the tying means holding the support members together.
Figure 28:
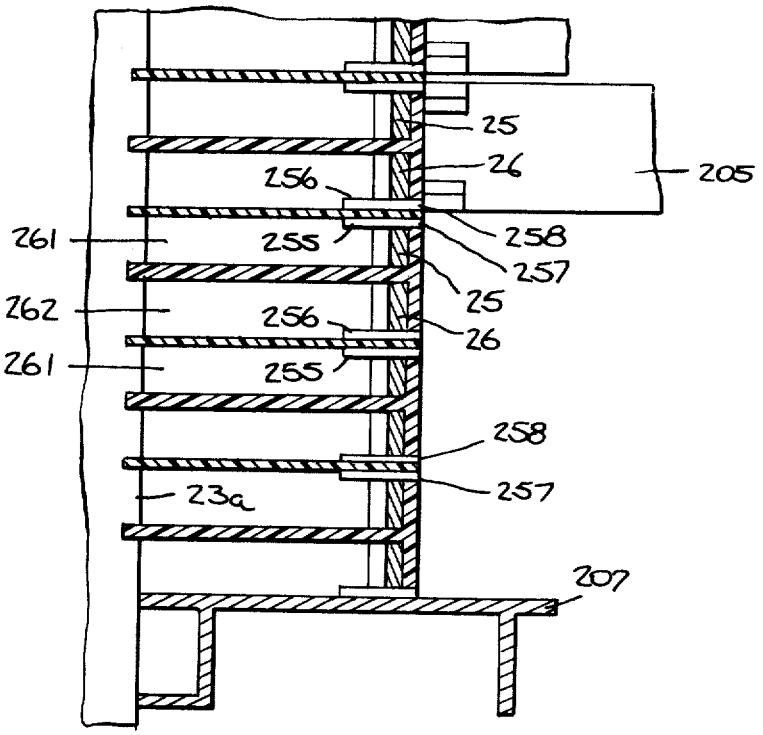
FIG. 28 is a cross-sectional view of the cross-connect load section taken along lines similar to 28—28 of FIG. 22 at the other end of the panel.

The load-rail-backing member is marked on exterior surface to indicate each bus bar. The contact assemblies and associate circuit breakers are correlated by identical members being placed on the handles 271 and the exterior surface of the load-rail-backing members adjacent the associated circuit breaker. The toggles on the circuit breakers are on the opposite side from the supports. The patch panel may be mounted with the bus bars extending vertically as shown in FIG. 23 or may extend horizontally with the modules extending horizontally or the patch panel may be set horizontal with the contact assemblies moving horizontally in the channels. The preferred manner is to position the panel with the bus bars extending vertically and the contact module extending horizontal to indicate each bus bar. The surfaces are also marked at each end to identify or number the associated circuit breaker. The contacted assemblies carry the corresponding number.

In the embodiment of FIGS. 22 to 27 the supports may be made from extruded aluminum and cut to the desired length. The supports are easily fastened together by the rods 202 passing through bus bars and insulating strips. Grommets isolate the copper bars.

The third embodiment is the preferred embodiment due to its simplicity in structure and readily adaptable to various sizes and lengths. The horizontal positioning of the contact modules and left-to-right reading of the markings and movement of the contact assemblies make it an easy patch panel to operate. The availability of the lugs at the rear and the terminals of the circuit breakers along the sides makes it very easy to connect to the load and supply lines. Summary of Features and Advantages.

It is thus seen from the foregoing description that the supporting frame may be made from molded plastic pieces or from extruded aluminum. The pieces may be readily assembled and formed into a supporting frame that holds the power buses so that the conductive strips may be used having a considerable length is relation to thickness and contact area. This provides for a considerable amount of copper to carry the current and dissipate heat that may be produced between the engaging surfaces of the power buses and the contact blades.

The contact assemblies may be made of molded plastic pieces that are easily assembled to provide a positive blocking of the contact blade out of engagement and a positive engagement of the contact blade without the contact assembly or the actuator varying the longitudinal position, so that at all times the position of the contact assembly in relation to the power bus being engaged remains fixed. Thus there is no doubt as to the power bus being engaged.

The cross-connect modules also are readily manufactured by standard plastic-molding techniques and are readily assembled and mounted on the supporting frame. Individual modules may be independently removed from the supporting frame. The terminals on the cross-connect modules and the terminals on the power buses are readily accessible for connecting leads thereto. The connection of the leads to the power bus terminals readily permits the rotation of the panel from its seating in a casing for maintenance purposes.

Various modifications and changes may be made in the foregoing embodiments without departing from the invention as set forth in the appended claims.

I claim:

1. A cross-connect panel comprising a bus bar supply section having a plurality of thin bus bars and insulating strips, each bus bar and strip having a width many times its thickness, said bus bars and strips being in side-by-side interleaved relation with said strips electrically isolating said buses, and a support frame having two supports along said side-by-side interleaved bus bars and strips on opposite sides thereof and means for rigidly fastening and pressing said interleaved bus bars and strips together; and a cross-connect load-section mounted on said support frame and having a plurality of cross-connect modules, each module having two end members attached respectively to said supports, partition means forming channel means, rail means in said channel means and extending transversely across said bus bars, and brush assembly means in said channel means for connecting said rail means to any one of said bus bars.

2. A cross-connect panel as set forth in claim 1 wherein said fastening means are spacing members at opposite ends of said bus bar supply section and said supports are secured thereto in pressing relation with said interleaved bus bars and strips.

3. A cross-connect panel as set forth in claim 2 wherein said supports are each a plurality of supporting blocks in aligned side-by-side relation and rodlike means extending through said supporting blocks of each support and said spacing members for fastening said spacing members and said blocks together.

4. A cross-connect panel as set fortth in claim 3 wherein said support blocks and said modules are the same width.

5. A cross-connect panel as set forth in claim 4 wherein said two end members of each module are mounted on and attached to respective blocks on opposite sides of said bus bar supply section.

6. A cross-connect panel as set forth in claim 3 wherein said spacing members have grooves extending lengthwise of said spacing members and said bus bar supply section fits at opposite ends into said grooves, respectively.

7. A cross-connect panel as set forth in claim 1 wherein said insulating strips extend beyond said bus bars on said cross-connect load section to form grooves for receiving said brush assembly means to engage respective bus bars.

8. A cross-connect panel as set forth in claim 1 wherein said support frame has traps extending laterally across said frame on the side opposite to said cross-connect load section and fastened to said supports.

9. A cross-connect panel as set forth in claim 1 wherein said partition means comprises two partition walls.

10. A cross-connect panel as set forth in claim 9 wherein said each of said modules has one of said partition walls extending between midportions of said module end members and in alignment with said respective module end members, said modules each having a top member extending between said two respective aligned module members and perpendicular to said one partition wall along the opposite edge from said bus bar supply section to form two channel means, and said other partition wall is positioned on the sides of said aligned end members to separate said channel means of adjacent modules.

11. A cross-connect panel as set forth in claim 1 wherein said supports each is a single piece of extruded aluminum having means for fastening said end members of said modules.

12. A cross-connect panel as set forth in claim 11 wherein said supports are U-shaped.

13. A cross-connect panel as set forth in claim 12 wherein said U-shaped support each has two side portions parallel to said bus bar supply section and an end portion connecting said side portions having edges engaging said bus bar supply section for pressing said bars and strips in interleaved relation.

14. A cross-connect panel as set forth in claim 1 wherein each of said supports has a main portion perpendicular to said bars and strips and inner flange perpendicular to said main portion with said inner flange bearing against said bus bar supply section.

15. A cross-connect panel as set forth in claim 14 wherein said fastening means are rods extending through said bus bars and strips and said inner flanges of said supports on opposite sides of said bus bar supply section and means on said rods for securing said supports and said bus bar supply section together.

16. A cross-connect panel as set forth in claim 15 wherein said main portions have inner and outer portions, respectively, and said end members are attached to respective outer portions.

17. A cross-connect panel as set forth in claim 16 wherein said inner and outer portions of respective supports are at different levels and said inner portions have deformable flanges extending towards said respective outer portions to form narrow slots therewith for attaching said end members.

18. A cross-connect panel as set forth in claim 17 wherein said deformable flanges have beads extending longitudinally therealong for engagement by a tool pressing said deformable flanges toward said respective outer portions.

19. A cross-connect panel as set forth in claim 17 wherein said end members have mounting clips fitting into said slots between said respective deformable flanges and respective outer portions for attaching said end members to said respective supports.

20. A cross-connect panel comprising a bus bar supply section having a plurality of thin bus bars and insulating strips, each bus bar and strip having a width many times its thickness, said bus bars and strips being in side-by-side interleaved relation with said strips electrically isolating said buses, and a support frame having two supports along said side-by-side interleaved bus bars and strips on opposite sides thereof and means for rigidly fastening and pressing said interleaved bus bars and strips together and a cross-connect load section mounted on said support frame and having a plurality of cross-connect modules each having two rails and two brush assemblies engaging a respective rail and movable for contacting any one of said bus bars and two circuit breakers at a respective end of each module connected to a respective rail for connecting two loads and for mounting said each module on said supports.

21. A cross-connect module comprising a T-shaped insulating means having a longitudinally extending insulating partition and a longitudinal crossmember on and perpendicular to said partition to form two longitudinal channels, mounting means at each end of said T-shaped insulating means and having parallel sidewalls spaced from said partition, inner walls and outer walls extending between said sidewalls of a respective mounting means, said T-shaped insulating means fitting in said mounting means and engaging said outer walls for imparting a given longitudinal length to the module, two load rails extending longitudinally along said crossmember on opposite sides of said partition, rail spacers positioned in said mounting means for supporting said load rails on said inner walls of said mounting means, brush assemblies in said respective channels and engaging said respective load rails to connect said load rails to power buses extending laterally to said T-shaped insulating means.

22. A brush assembly positioned between a plurality of parallel extending buses and a load rail extending crosswise thereto and spaced therefrom comprising a housing positioned between said load rail and said buses, an actuating lever having a contact member mounted thereon for engaging a given bus, said actuating lever and said housing having means for pivotally attaching said lever to said housing including means permitting relative linear movement of said actuating lever to said housing for moving said actuating lever between a contacting position and a raised position, a contact button for engaging said load rail and having electrically conductive means connected to said contact member for passing current between a respective brush and said load rail, a resilient means connected to said contact member and said contact button for applying contact pressure to said buses and load rail and engaging said housing for providing pressure between said actuating lever and said housing in the direction of the relative linear movement, and catch means on said actuatlever and said housing for holding said actuating lever and contact member in a raised position and disengaging on application of pressure lateral to said linear movement for moving said contact member into the bus-engaging position.

23. A brush assembly comprising a housing, an actuating lever, a contact member, a contact button, a generally U-shaped electrically conductive springlike resilient means having a bend and two spaced ends attached respectively to said contact member and button, said actuating lever having means holding said contact member and said respective end of said springlike resilient means having means for pivotally attaching said actuating lever to said housing at a distance from said contact member in the same direction as said bend of said U-shaped means from said spaced ends, said housing having means with said pivotal attaching means fitting thereon to permit limited movement of said pivotal attaching means longitudinal to said U-shaped means, said actuating lever having a finger, said housing having a catch and having support means spaced from said catch with said U-shaped means between said catch and support means for engaging said support means to press said finger into engagement with said catch for holding said actuating lever and contact member in a raised position and finger disengaging from said catch under pressure transverse to said limited movement to rotate said contact member into engaging position.

*24. A cross connect panel comprising:*

*a bus bar supply section, a back and opposite sides and plurality of thin bus bars and the insulating strips transverse to said back each bus bar and strip having a width many times its thickness, said strips electrically isolating said bus bars normal to said back;*

*a support frame having two supports along the sides of said bus bar supply section on opposite side thereof and extending through said bus bars and insulating strips and connecting means for securing said supports for rigidly fastening and pressing said interleaved bus bars and strips together; and a cross connect load section mounted on said support frame and having a plurality of separate, individual cross connect modules transverse to said bus bars and having a plurality of side-by-side channels, transversely extending rail means in said respective channels and transversely movable brush assembly means for connecting said respective rail means to any one of said bus bars.*

*25. A cross connect panel as set forth in claim 24 wherein said strips and said bus bars have aligned openings for passing said connecting means and bevels on said bus bars around the openings therein and insulating means in said bus bar openings, said insulating means initially having a width slightly than the thickness of the respective bus bars, the openings of said adjacent insulating strips being smaller than said bevels and bus bar openings to deform said insulating means on tightening of said connecting means by pressing said insulating means in saia bevels.*

*26. A cross connect panel as set forth in claim 24 wherein said connecting means are a plurality of conductive rods bolted to said supports and said bus bars and insulating strips have openings for passing said rods, said bus bar openings being larger than said insulating strip openings and having bevels facing the adjacent strip, insulating means in the openings of said bus bars and having an initial width greater than the thickness of the respective*

*bus bar and of deformable electrically insulating material to flow into said bus bars and strip means on opposite side thereof, connecting rods extending through said openings and insulating means and being fastened to said supports for pressing said interleaved bus bars and strip means together;*

*a cross connect load section mounted on said support frame and having a plurality of cross connect modules, each module having two rails and two brush assemblies engaging a respective rail and movable for contacting any one of said bus bars and two circuit breakers at a respective end of each module for connection of a respective rail to a load.*

*27. A cross connect panel comprising:*

*a bus bar supply section having a plurality of bus bars spaced in side-by-side relation and insulating means therebetween to electrically isolate said bus bars;*

*frame means for supporting said bus bars and insulating means; and*

*a cross connect load section mounted on said support frame means and having a plurality of separate cross connect modules, each module having end members attached to said frame means, partition means forming channels, rail means in said channels and extending transversely across said bus bars and movable brush assemblies in said respective channels for connecting said rail means to any one of said bus bars.*

*28. A cross connect panel comprising a bus bar supply section having a back and two opposite sides and having a plurality of thin bus bars and insulating strip means, each bus bar and strip means having a width many times its thickness, said bus bars and strip means being in side-by-side interleaved relation, said strip means electrically isolating said buses and, said bus bars and said strip means having openings therethrough for passing connecting rods;*

*a support frame having two supports on said respective sides and along said side-by-side interleaved bus bars and strip means of said supply section and having connecting rods extending through said openings and bolted to said supports to compress said bars and strip means together, said strips forming grooves over and along said bus bars;*

*a cross connect load section mounted on said support frame and said bus bar supply section, said load section having a plurality of separate cross connect modules; each module having end members attached to said supports, partition means forming two channels, rail means in said channels and extending transversely across said bus bars and contact assemblies in said respective channels for connecting said rails to any one of said bus bars.*

References Cited

The following references, cited by the Examiner, are of record in the patented file of this patent or the original patent.

UNITED STATES PATENTS

| | | | |
|---|---|---|---|
| 2,796,473 | 6/1957 | Davis | 200—16 D |
| 3,467,922 | 9/1969 | Greenwall, Jr. et al. | 335—161 |
| 3,496,421 | 2/1970 | Greenwall, Jr. | 317—112 |

JAMES R. SCOTT, Primary Examiner

U.S. Cl. X.R.

200—16 D; 317—112